United States Patent [19]

Marttila

[11] Patent Number: 5,084,305
[45] Date of Patent: Jan. 28, 1992

[54] METHOD AND APPARATUS FOR IMPREGNATING A CONTINUOUS FIBER BUNDLE WHEREIN A NOZZLE IMPINGES ON THE FIBER BUNDLE IN A CHAMBER

[75] Inventor: Pauli Marttila, Helsinki, Finland

[73] Assignee: Neste OY, Finland

[21] Appl. No.: 549,373

[22] Filed: Jul. 6, 1990

[30] Foreign Application Priority Data

Jul. 14, 1989 [FI] Finland ................. 893438

[51] Int. Cl.$^5$ .............................. B05D 3/02
[52] U.S. Cl. ................. 427/389.8; 427/434.2; 427/355; 427/209; 118/405; 118/410; 118/411; 118/DIG. 18
[58] Field of Search ......... 427/434.2, 209, 389.8, 427/398.3, 389.7, 420, 294, 358, 355; 118/405, 410, 411, DIG. 18

[56] References Cited

U.S. PATENT DOCUMENTS

| | | | |
|---|---|---|---|
| 2,972,185 | 2/1961 | Brennan | 427/209 |
| 3,298,353 | 1/1967 | Huffman | 118/411 |
| 3,957,940 | 5/1976 | Schubert et al. | 427/209 |
| 4,020,194 | 4/1977 | McIntyre et al. | 427/172 |
| 4,048,950 | 9/1977 | Rakowicz et al. | 118/6 |
| 4,288,475 | 9/1981 | Meeker | 427/294 |
| 4,397,624 | 8/1983 | Haverkamp et al. | 425/113 |
| 4,413,585 | 11/1983 | Weinhold et al. | 118/61 |
| 4,576,109 | 3/1986 | Bok | 427/294 |
| 4,728,387 | 3/1988 | Hilakos | 118/411 |
| 4,769,286 | 9/1988 | LeNoane | 427/389.8 |
| 4,772,493 | 9/1988 | Syrop et al. | 427/389.8 |
| 4,804,509 | 2/1989 | Angell, Jr. et al. | 427/209 |

Primary Examiner—Michael Lusignan
Assistant Examiner—Diana L. Dudash
Attorney, Agent, or Firm—Steinberg & Raskin

[57] ABSTRACT

The present invention concerns a method and an apparatus for impregnating a continuous fiber bundle or fiber bundles (10) with molten or fluid curing resin in manufacturing fiber reinforced material, the material comprising one or several fiber bundles (10) encircled by matrix resin. The fiber bundles (10) are so conducted to pass across the nozzle opening (13) that the resin runs through the nozzle (11) from a higher pressure zone through the fiber bundle (10) to a lower pressure zone.

9 Claims, 1 Drawing Sheet

METHOD AND APPARATUS FOR IMPREGNATING A CONTINUOUS FIBER BUNDLE WHEREIN A NOZZLE IMPINGES ON THE FIBER BUNDLE IN A CHAMBER

BACKGROUND OF THE INVENTION

The present invention concerns a method and an apparatus for impregnating a continuous fiber bundle. The method and the apparatus of the invention are appropriate for impregnating fiber bundles with molten or fluid resin in manufacturing fiber-reinforced materials consisting of a reinforced fiber bundle or fiber bundles bound with a thermoplastic resin material which forms a matrix.

The greatest problem related to manufacturing such products is the viscosity of certain materials included in the matrix resin. Since individual fibers in fiber bundles lie very close to one another, it is difficult to effectuate the resin material penetration into a resin bundle and its surrounding of all individual fibers. This is however, indispensable considering the desired properties of the product, such as strength, rigidity, chemical durability, further processability, etc.

Endeavors have been made to develop a number of solutions to the problem. In one method, fiber bundles are conveyed through a so-called crosshead die, in which molten or liquid resin is made to enter into fiber bundles travelling through the nozzle chamber at elevated pressure. The crosshead-die procedure has proved inefficient in impregnating fiber bundles with thermoplastic resin because not all individual fibers get surrounded with resin although during the absorption phase the fibers are kept at elevated pressure. For impregnating reinforcing fibers, the range of viscosity of resin 1 to 10 PaS would be desirable, the typical order of magnitude being $10^2$ PaS, and in some cases, the order of magnitude $10^3$ PaS being acceptable. However, a typical range of viscosity for molten thermoplastic resins is $10^2$ to $10^6$ PaS order of magnitude; it is thus obvious that with the crosshead die procedure surrounding all individual fibers with resin is extremely difficult if not impossible.

SUMMARY OF THE INVENTION

An object of the present invention is to provide an efficient method for strengthening a fiber bundle by impregnating it with curing resin such that individual fibers of the bundle are encircled by the curing resin.

Another object of the present invention is to provide an apparatus which functions to strengthen a fiber bundle by impregnating it with curing resin such that the resin surrounds individual fibers therein.

These and other objects of the present invention are attained by the apparatus and the invention which discloses a method and an apparatus for impregnating a continuous fiber bundle or fiber bundles with molten or fluid curing resin such that even individual fibers are encircled with resin. The method of the invention for impregnating a continuous fiber bundle or fiber bundles with molten thermoplastic or curing resin in manufacturing fiber-reinforced material, the material comprising one or more fiber bundles impregnated with matrix resin, is characterized in that the fiber bundles are so guided as to pass across a nozzle opening such that molten resin flows from the nozzle at elevated pressure through the fiber bundle to a zone of lower pressure.

In the simplest embodiment of the procedure of the invention, a fiber bundle or fiber bundles to be impregnated is/are guided to pass across the opening of a nozzle head, from which head molten resin at elevated pressure emerges. The nozzle may be connected, e.g., to an extruder in which melting and processing of the plastic is carried out, or to a tank in which the ingredients of thermosetting resin are mixed. The fiber bundle to be impregnated may be at atmospheric pressure or, if desired, at a lower pressure.

According to an embodiment of the procedure of the invention, the nozzle head is located in a chamber which contains molten resin, through which the fiber bundles to be impregnated flow. A lower pressure is then prevalent in the chamber than in the nozzle through which the molten thermoplastic resin flows.

By the procedure of the invention, any fiber-reinforced material can be produced in which the fibers lie in the form of bundles. The fibers may be any such fibers that can be bound to matrix resin. Such products are, for instance, long-fiber reinforced granulates for injection molding and other processes, pre-cured or pre-absorbed materials for conventional processes, such as pultrusion, filament rolling, tape lamination, etc. The product to be produced in the process is a continuous tape which can be used for pultrusion, etc. When cut to appropriate length, the product forms long-fiber granulates of about 3 to 20 mm length.

Thus, in the procedure of the invention, fibers such as fiberglass, carbon fibers and aramide fibers, and thermoplastic fibers can be used. Among the most common reinforced fibers are fiberglass products which products can be used individually or combined into bundles, or also in woven, braided or otherwise worked shapes. Fiberglass bundles typically contain thousands of individual fibers, usually with diameters of about 10 to 17 $\mu$m.

The resin material used for binding fibers of fiber-reinforced material may be, for instance thermoplastic resin, which is impregnated into the bundles in its molten state, or thermosetting resin, which after being impregnated into the bundles is set with external energy, such as heat, chemical reaction, UV radiation, magnetic field, radiation, etc.

Suitable thermoplastic resins are, for instance homopolymers and copolymers of olefins, homopolymers and copolymers of vinyl chloride, polyethylene terephtalate, homopolymers and copolymers of acrylonitrile, polyamides and copolyamides, thermoplastic polymers of formaldehyde, polycarbonate, polysulphone, and mixtures of any two or several of the above-mentioned polymers.

The invention also concerns an apparatus for impregnating a continuous fiber bundle or fiber bundles with molten or fluid curing resin so that even individual fibers become surrounded with resin. The apparatus for the invention for absorbing a continuous fiber bundle or fiber bundles with molten o fluid curing resin in manufacturing fiber-reinforced material, the material comprising one or several fiber bundles encircled by matrix resin, is characterized in that it comprises one or more nozzle members with a nozzle opening for conducting molten thermoplastic or thermosetting resin from a higher pressure area to a lower pressure scan, and members for conducting said fiber bundles across said the nozzle opening runs through the fiber bundles to a lower pressure area.

According to a embodiment of the apparatus of the invention, it comprises an impregnation chamber in which the impregnation takes place and the pressure prevailing therein is lower than the pressure prevailing in the nozzle.

According to another embodiment of the apparatus of the invention, the fiber bundles are taken through the chamber across the nozzle opening/openings of one or several nozzle members. A so-called crosshead-die method may herewith be applied in such manner that the impregnation chamber is not directly connected e.g. with an extruder producing a required absorption pressure. Instead, molten resin runs from a higher pressure into the nozzle chamber in which a lower pressure is prevalent and from which extra resin may freely run out, and it can be returned to the feed side of the extruder. Thereby a double impregnation influence is provided because the fiber bundle to be impregnated flows through the molten resin present in the chamber, and at the same time, it crosses the nozzle opening wherefrom molten, pressurized resin runs directly through the fiber bundle.

According to an embodiment of the apparatus of the invention, the impregnation chamber may in addition contain such members as to reshape the fiber bundle to be impregnated, for instance by flattening and widening the fiber bundle track, which members facilitate the discharging of resin through the fiber bundles. The forming member may be e.g. rod-like members, their direction being either horizontal or transversal, or oblique, relative to the fiber bundle to be impregnated.

DESCRIPTION OF THE DRAWING

The invention is described further, through not thereby being confined, by referring to the Figures enclosed, in which.

DESCRIPTION OF THE PREFERRED EMBODIMENTS

Figure 1:
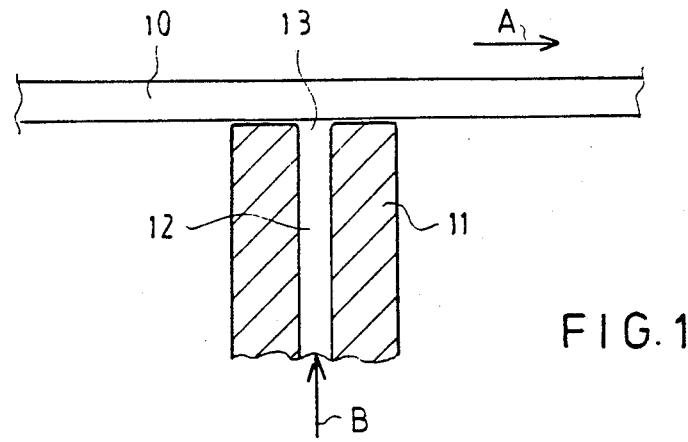
FIG. 1 presents schematically a simple embodiment of the apparatus of the invention.

In FIG. 1 a fiber bundle or fiber bundles 10 passes/pass in the direction marked with arrow A across the nozzle opening 13 of a nozzle 11. A nozzle duct 12 runs through the nozzle 11, wherethrough molten thermoplastic resin runs (arrow B) from a higher pressure, for instance, through an extruder (not shown). The molten resin is thus forced to flow out from the nozzle opening 13 through a mat of fiber bundles 10, whereby the fibers become encircled with molten resin. The impregnated fiber bundle mat may thereafter be molded and cured by methods known in the prior art (not shown).

Figure 2:
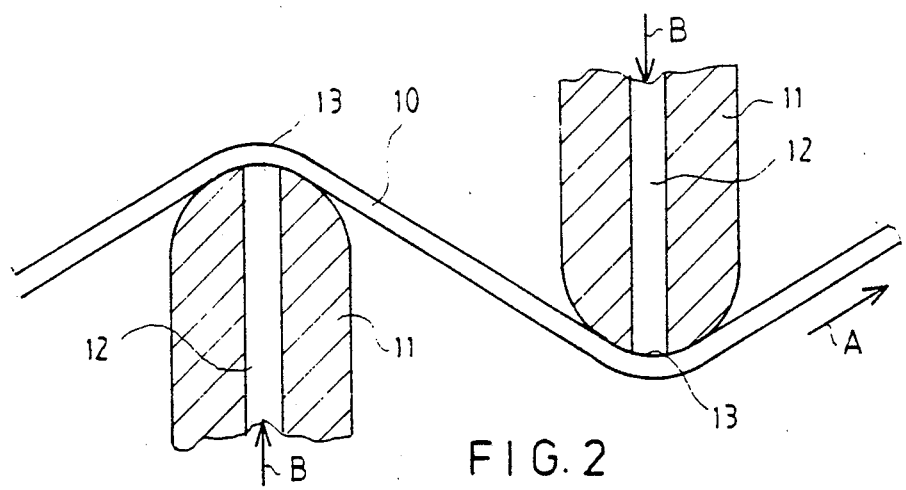
FIG. 2 presents two nozzle members which are located on different sides of the fiber bundle to be impregnated.

FIG. 2 presents two nozzles 11 placed on different sides to the fiber bundle mat 10. Thereby, molten resins flows twice through the fiber bundle mat 10 and the flow directions of the resin (arrows B) are opposite, thus intensifying the impregnation.

Figure 3:
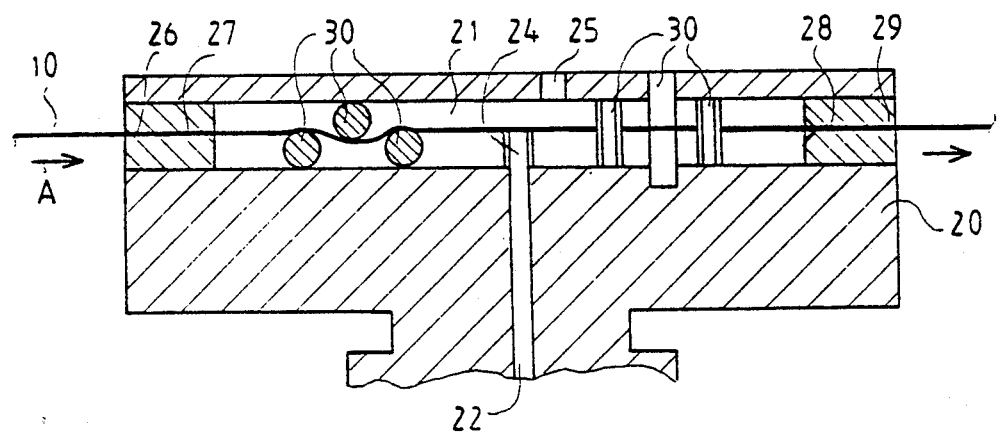
FIG. 3 presents the impregnation apparatus of the invention containing an impregnation chamber.

In FIG. 3 is shown an impregnation means 20 which contains an impregnation chamber 21. A nozzle duct 22 leads into the impregnation chamber, the duct being connected for instance, with an extruder (not shown). The nozzle duct 22 terminates in the impregnation chamber 21 through the nozzle opening 24. In the chamber 21 is moreover located an outlet opening through which excessive molten resin is conducted out of the chamber 21, and it may be returned to the extruder. The fiber bundle mat 10 to be impregnated is conducted into the chamber 21 through the inlet opening 26 and the inlet duct 27, which is narrow enough to prevent the molten resin from running out of the chamber 21 therethrough. The impregnated fiber bundle mat exits from the impregnation chamber 21 through the outlet duct 28 and the outlet opening 29.

Since in the means of FIG. 3 an outlet opening 25 has been provided in the impregnation chamber 21, which is in connection either with the outside ambient air, or in any case, with a lower pressure zone, discharging of the molten resin from a higher pressure zone (from the duct 22) through the fiber bundle mat 10 (chamber 21) is thereby produced. It should be clear that one or several nozzles 24 may be provided and that they may be located on one side or on different sides of the fiber bundle track 10. In addition, one or several guiding members, such as rods 30, may be advantageously arranged in the chamber 21, by the aid of which the fiber bundle mat to be impregnated may be guided and reshaped prior to an impregnation point or thereafter.

In addition, pretreatment of the resin to be impregnated may be applied in the procedure and the apparatus of the invention to reduce its viscosity. If an apparatus such as is shown in FIG. 3 is employed, it is also feasible to conduct into the chamber 21 a different kind of resin than the one conducted through the nozzle 24, or also another agent for the procedure, such as a moistening agent, etc.

Obviously, numerous modifications and variations of the present invention are possible in the light of the above teaching. It is therefore to be understood that within the scope of the claims appended thereto, the invention may be varied from that specifically disclosed herein.

What is claimed is:

1. A process for impregnating a continuous fiber bundle with molten or fluid curing resin during the manufacture of fiber reinforced material, said material comprising one or more fiber bundles encircled by matrix resin, comprising
   providing a flow of molten resin which contacts said fiber bundle,
   guiding said fiber bundle contacted with said flow of molten resin in a substantially perpendicular direction past a nozzle having a nozzle opening, such that such nozzle opening impinges on said fiber bundle; and
   maintaining the pressure within said nozzle at a higher level than the pressure outside of said nozzle such that said resin is impelled through said nozzle to an area of lower pressure, and such that said resin impregnates said fiber bundle
   and further comprising providing a chamber as said area of lower pressure, said fiber bundle being guided past said nozzle opening in said chamber.

2. The process of claim 1, further comprising providing an extruder to produce the higher pressure in said nozzle.

3. The process of claim 2, further comprising running said fiber bundle past an opening of a second nozzle, said second nozzle being situated such that its opening is located at an angle which is substantially different relative to the angle of impingement on said fiber bundle by resin impelled from said nozzle.

4. An apparatus for impregnating a continuous fiber bundle with molten or fluid curing resin during the manufacture of fiber reinforced material, said material comprising one or more fiber bundles encircled by matrix resin, comprising
- an impregnation chamber, said chamber being provided with a flow of molten resin,
- means for conveying a fiber bundle through said chamber such that said flow of molten resin contacts said fiber bundle,
- a nozzle arranged such that an opening of said nozzle impinges on said fiber bundle in a perpendicular direction within said chamber, and
- means for providing a pressure within said nozzle at a higher level that the pressure in said chamber such that said resin is impelled through said nozzle and impregnates said fiber bundle.

5. The apparatus of claim 4, wherein said means for providing a pressure within said nozzle comprises an extruder.

6. The apparatus of claim 5, wherein said impregnation chamber further comprises an outlet opening through which excessive molten resin is conducted out of the chamber.

7. The apparatus of claim 6, wherein said impregnation chamber further comprises guiding members for guiding said fiber bundle through said impregnation chamber.

8. The apparatus of claim 4, further comprising a second nozzle, said second nozzle arranged such taht an opening of said second nozzle is located in said impregnation chamber and said opening of said second nozzle impinges against said fiber bundle, such that resin impelled from said second nozzle against said fiber bundle opposes the flow of resin from said nozzle.

9. The apparatus of claim 4, wherein said nozzle is a first nozzle which impinges said fiber bundle on a first side of said fiber bundle, the apparatus further comprising a second nozzle impinging an opposite side of said fiber bundle, and means for providing a pressure in said second nozzle at a higher level than the pressure within said chamber.

* * * * *